(12) United States Patent
Deng et al.

(10) Patent No.: US 7,033,164 B2
(45) Date of Patent: Apr. 25, 2006

(54) NOZZLE-CONTACTING DEVICE OF INJECTION MOLDING MACHINE

(75) Inventors: Ming-Chang Deng, Hsinchu (TW); Chia-Hung Lin, Hsinchu (TW); Wen-Hung Feng, Pingjen (TW); Ming-Chi Chen, Toucheng Jen (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/353,998

(22) Filed: Jan. 30, 2003

(65) Prior Publication Data

US 2004/0096541 A1    May 20, 2004

(30) Foreign Application Priority Data

Nov. 20, 2002    (TW) .............................. 91218639 U

(51) Int. Cl.
*B29C 45/64*    (2006.01)
(52) U.S. Cl. ...................... 425/589; 425/590
(58) Field of Classification Search ................ 425/589, 425/590
See application file for complete search history.

(56) References Cited

U.S. PATENT DOCUMENTS

| 5,382,158 | A | * | 1/1995 | Herbst | 425/589 |
| 5,895,670 | A | * | 4/1999 | Jaroschek et al. | 425/589 |
| 6,203,312 | B1 | * | 3/2001 | Romi | 425/589 |
| 6,554,606 | B1 | * | 4/2003 | Koide et al. | 425/590 |

* cited by examiner

*Primary Examiner*—Tim Heitbrink
(74) *Attorney, Agent, or Firm*—Rosenberg, Klein & Lee

(57) ABSTRACT

A nozzle-contacting device of an injection molding machine includes an injection module and a mold-holding structure both set on a lathe bed. The injection module sets a nozzle at a front end thereof and a nozzle-adjusting device, which is fixed and locked on the lathe bed, at a back end thereof. The mold-holding structure includes a mold-clamping structure and an adjusting plate, wherein the mold-holding structure sets plural tie rods. A mold is fixed and locked on the adjusting plate which is sleeved on plural tie rods, and one or more driver set on a front end of a dead plate penetrates the dead plate to connect to the adjusting plate. Furthermore, the dead plate has a perforation set on a center thereof corresponding to a position of the nozzle of the injection module.

11 Claims, 6 Drawing Sheets

NOZZLE-CONTACTING DEVICE OF INJECTION MOLDING MACHINE

BACKGROUND OF THE INVENTION

1. Field of the Invention

The present invention relates to a nozzle-contacting device of an injection molding machine, and more particular to a nozzle-contacting device of an injection molding machine for avoiding a stuff leaking and reducing a defective fraction of the products.

2. Description of the Prior Art

Please refer to FIGS. 5~6 which illustrate the injection molding machines in the prior arts. In the conventional injection molding machines, a mold is locked and fixed on a mold-holding module and an injection module is driven by an oil cylinder for contacting a nozzle of the injection module with a mold cavity of the mold and injecting a plastic into the mold cavity through the nozzle to achieve the purpose of injection molding. Furthermore, please refer to FIG. 7 which illustrates an injection molding machine in U.S. Pat. No. 4,676,730. In this patent, the injection molding machine contacts the nozzle of the injection module with the mold cavity of the mold through a screw which is driven by a motor to inject the plastic into the cavity and achieve the purpose of injection molding. However, when an injection pressure or a retaining pressure is getting higher in the conventional injection molding machine, the plastic will leak from a clearance between the nozzle of the injection module and the mold owing to an insufficient contacting force therebetween. In addition, because the amount of the plastic which is injected into the cavity is exactly controlled, the situation of leaking during the injection molding will cause a defect in the finished product so as to form a defective.

Thus it can bee seen, the prior art described above still has some defects, is not a good design, however, and is urgently to be improved.

Because of the technical defects of the conventional nozzle-contacting device of the injection molding machine described above, the applicant keeps on carving unflaggingly to develop a nozzle-contacting device of an injection molding machine of the present invention through wholehearted experience and research.

SUMMARY OF THE INVENTION

It is an object of the present invention to provide a nozzle-contacting device of an injection molding machine for avoiding a stuff leaking.

It is another object of the present invention to provide a nozzle-contacting device of an injection molding machine for reducing a defective fraction of the finished products.

The nozzle-contacting device of the injection molding machine for achieving the purposes described above includes:

an injection module set on a sliding trough which is locked and fixed on a lathe bed, wherein a back end of the injection module is set a nozzle-adjusting device which is locked and fixed on the lathe bed; and a mold-holding structure set on the lathe bed and comprising an adjusting plate and a mold-clamping structure having plural tie rods, wherein the adjusting plate is sleeved on plural tie rods, and one or more driver is set on a front of the mold-clamping structure for penetrating a dead plate of the molding-holding structure and connecting to the adjusting plate;

wherein the injection module is set on a front end of the dead plate of the mold-holding structure and the dead plate has a perforation set on a centre thereof corresponding to a position of the nozzle of the injection module.

BRIEF DESCRIPTION OF THE DRAWINGS

The drawings disclose an illustrative embodiment of the present invention which serves to exemplify the various advantages and objects hereof, and are as follows.

REPRESENTATIVE SYMBOLS OF MAIN PORTIONS

Figure 1:
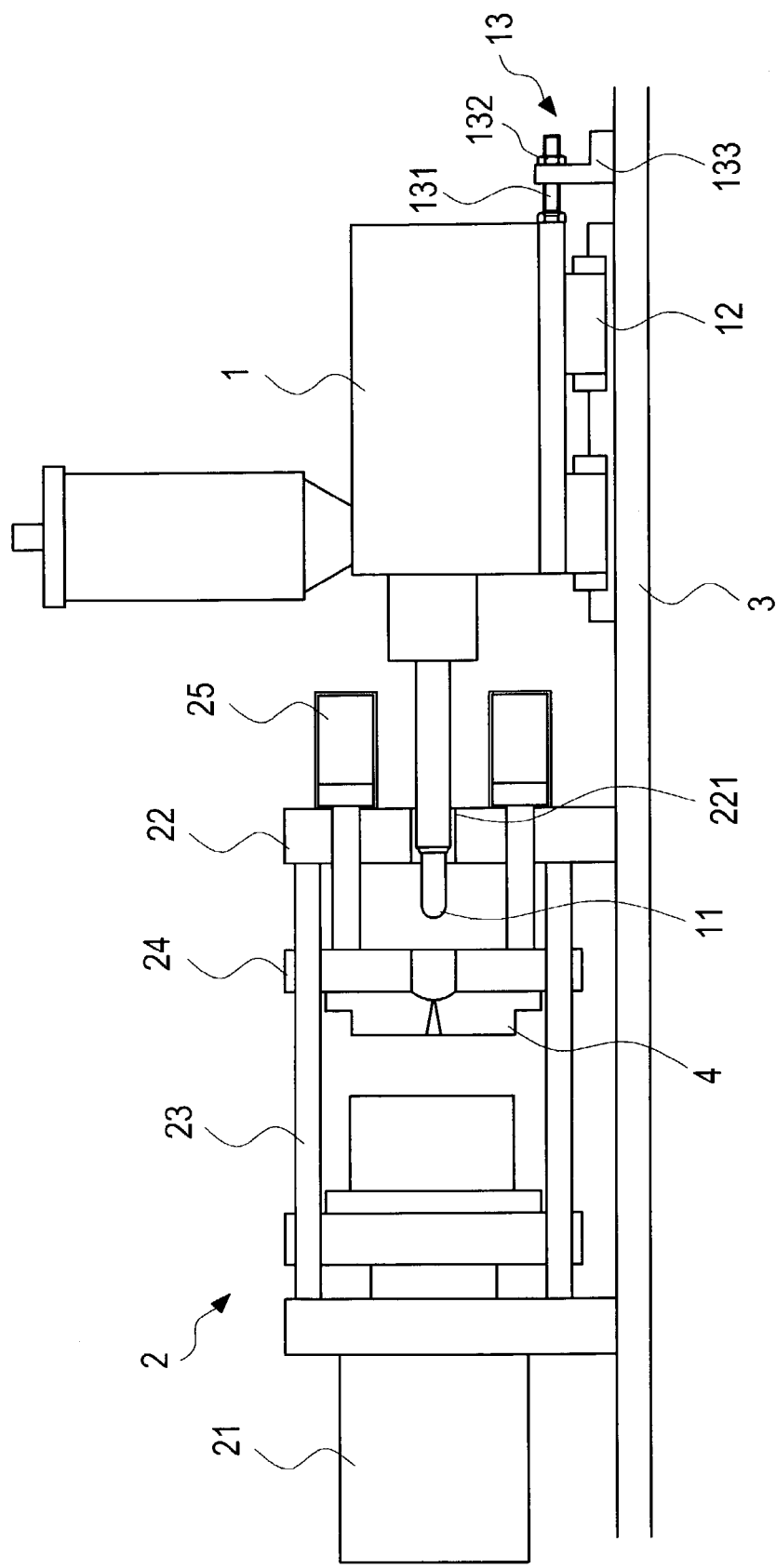
FIG. 1 shows a side view of the nozzle-contacting device of the injection molding machine according to the present invention.

1 Injection module
11 Nozzle
12 Sliding trough
13 Nozzle-adjusting device
131 Screw
132 Screw nut
133 Adjusting seat
2 Mold-holding structure
21 Mold-clamping structure
22 Dead plate
221 Perforation
23 Plural tie rods
24 Adjusting plate
25 Driver
26 Guiding rod
3 Lathe bed
4 Mold
5 Compressing clearance

DETAILED DESCRIPTION OF THE PREFERRED EMBODIMENT

Please refer to FIG. 1. The present invention provides a nozzle-contacting device of an injection molding machine, which comprises:

an injection module 1, wherein the injection module 1 has a nozzle 11 set on a front end thereof, the injection module 1 is set on a sliding trough 12 which is locked and fixed on a lathe bed 3, a back end of the injection module 1 is set a nozzle-adjusting device 13 which is locked and fixed on the lathe bed 3, and the nozzle-adjusting device 13 is capable of moving the injection module 1 to slide on the sliding trough 12 by utilizing a screw; and a mold-holding structure 2, wherein the mold-holding structure 2 is set on the lathe bed 3 and comprises a mold-clamping structure 21 and an adjusting plate 24; plural tie rods 23 are set on the mold-clamping structure 21, the mold 4 is fixed on the adjusting plate 24, and then the adjusting plate 24 is sleeved on each plural tie rods 23; one or more driver 25 is set on a front end of a dead plate 22 and is penetrated the dead plate 22 to connect to the adjusting plate 24; and one or more driver 25 is capable of driving the adjusting plate 24 to move on plural tie rods 23 by utilizing a vapour cylinder;

wherein the injection module 1 is set on the front end of the dead plate 22 of the mold-holding structure 2 and the dead plate 22 has a perforation 221 set on a centre thereof corresponding to a position of the nozzle 11 of the injection module 1.

Figure 2:
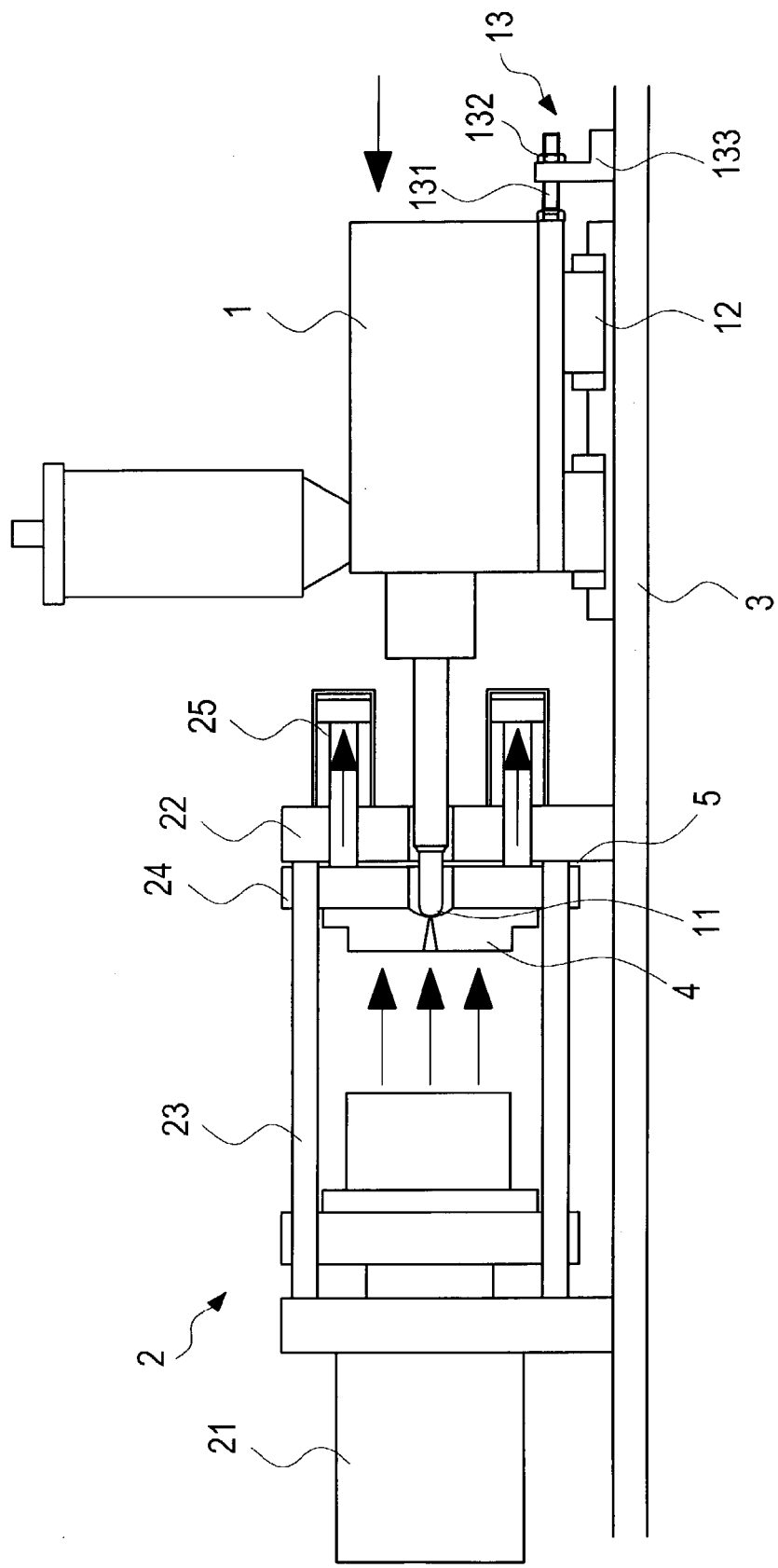
FIG. 2 shows a side schematic view (I) of the motions of the nozzle-contacting device in the injection molding machine according to the present invention.
Figure 3:
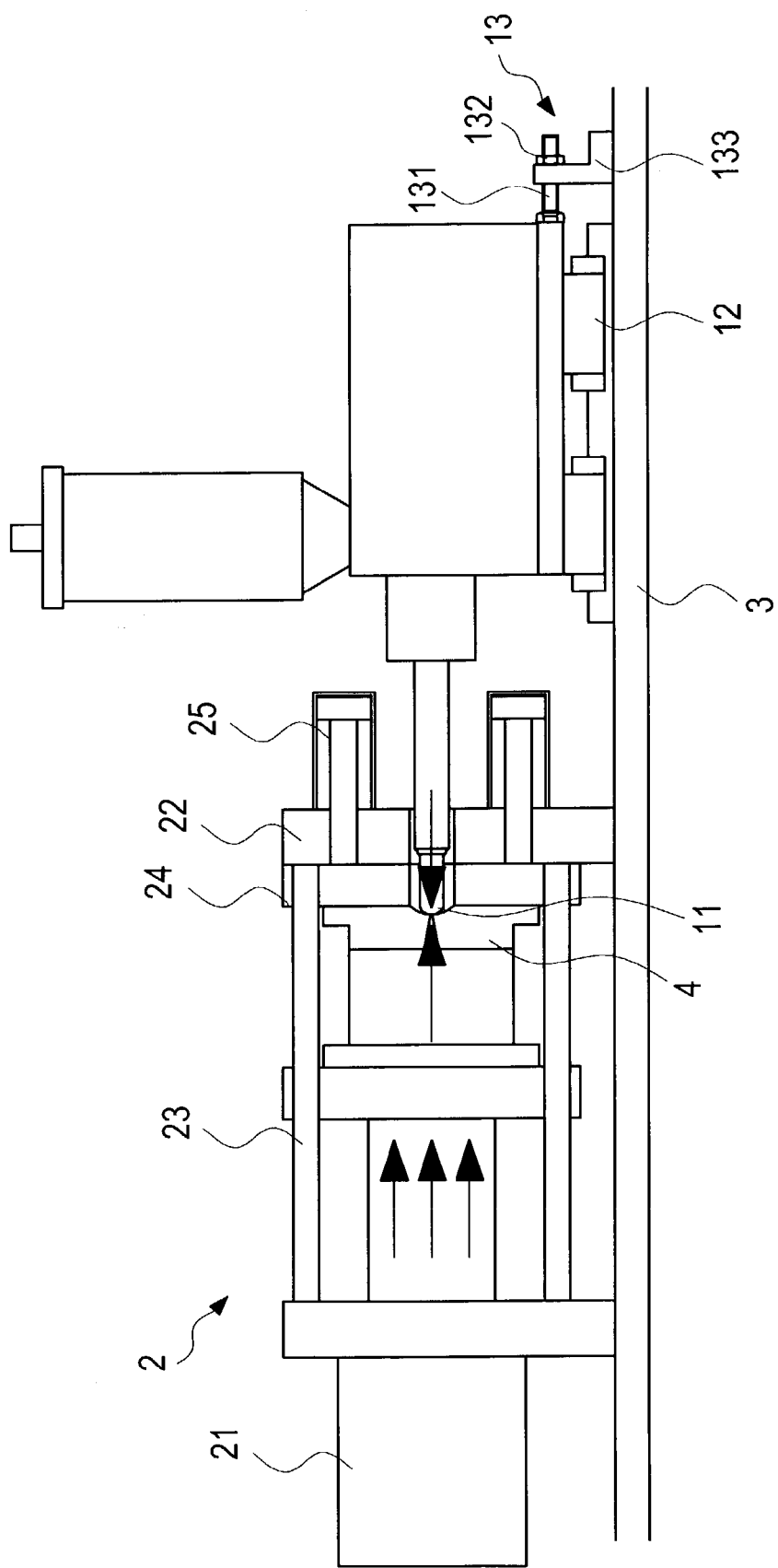
FIG. 3 shows a side schematic view (II) of the motions of the nozzle-contacting device in the injection molding machine according to the present invention.

Please refer to FIGS. 2~3. When the nozzle-contacting device of the injection molding machine according to the present invention is under used, the operation steps are described as followed. Firstly, the mold 4 is locked and fixed on the adjusting plate 24. Then, the adjusting plate 24 is driven by one or more driver 25 to move toward the dead plate 22 through a guiding of plural tie rods 23 and the nozzle 11 will contact with the mold 4 so as to produce a prestress. At this time, the nozzle-adjusting device 13 will reject against the back end of the injection module 1. The nozzle-adjusting device 13 is fixed on an adjusting seat 133 by utilizing a screw 131 and a screw nut 132, and when the screw 131 is rotated forward, the injection module 1 will slide to the mold-holding structure 2 through a sliding trough 12. Then, the nozzle 11 set at the front end of the injection module 1 will penetrate a perforation 221 of the dead plate 22 to contact with the mold 4. Simultaneously, the adjusting plate 24 will also be driven to move, and thus a compressing clearance 5 will be produced between the adjusting plate 24 and the dead plate 22. When the nozzle-adjusting device 13 moves backward to drive the nozzle 11 of the injection module 1 to move backward, the compressing clearance 5 will be reduced, namely the compressing clearance 5 is adjustable through forward and backward rotating the screw 131 of the nozzle-adjusting device 13. When the mold-clamping 21 is moving, the adjusting plate 24 will suffer a clamping force to compress the dead plate 22, and thus the pre-left compressing clearance 5 between the adjusting plate 24 and the dead plate 22 will disappear. And then, the nozzle 11 of the injection module 1 will take up the compression amount of the compressing clearance 5 to produce an elastic deformation, so that a contacting force will be produced between the nozzle 11 and the mold 4. Moreover, because the contacting force produced between the nozzle 11 and the mold 4 is formed by the clamping force produced by the mold-clamping structure 21, the contacting force will be greater than that produced by the power of the conventional injection molding machine. Consequently, the present invention can avoid the plastic leaking from the clearance between the nozzle 11 and the mold 4 when an injection pressure or a retaining pressure is getting higher so as to reduce the defective fraction. Otherwise, the nozzle-adjusting device 13 can utilize a vapour cylinder, a hydraulic cylinder, or a screw driven by a motor to replace the bolt to move the injection module 1 to slide on the sliding trough 12. In addition, one or more driver 25 can also utilize a hydraulic cylinder, a servo-motor, a screw, or a bolt to drive the adjusting plate 24 to slide on plural tie rods 23.

Figure 4:
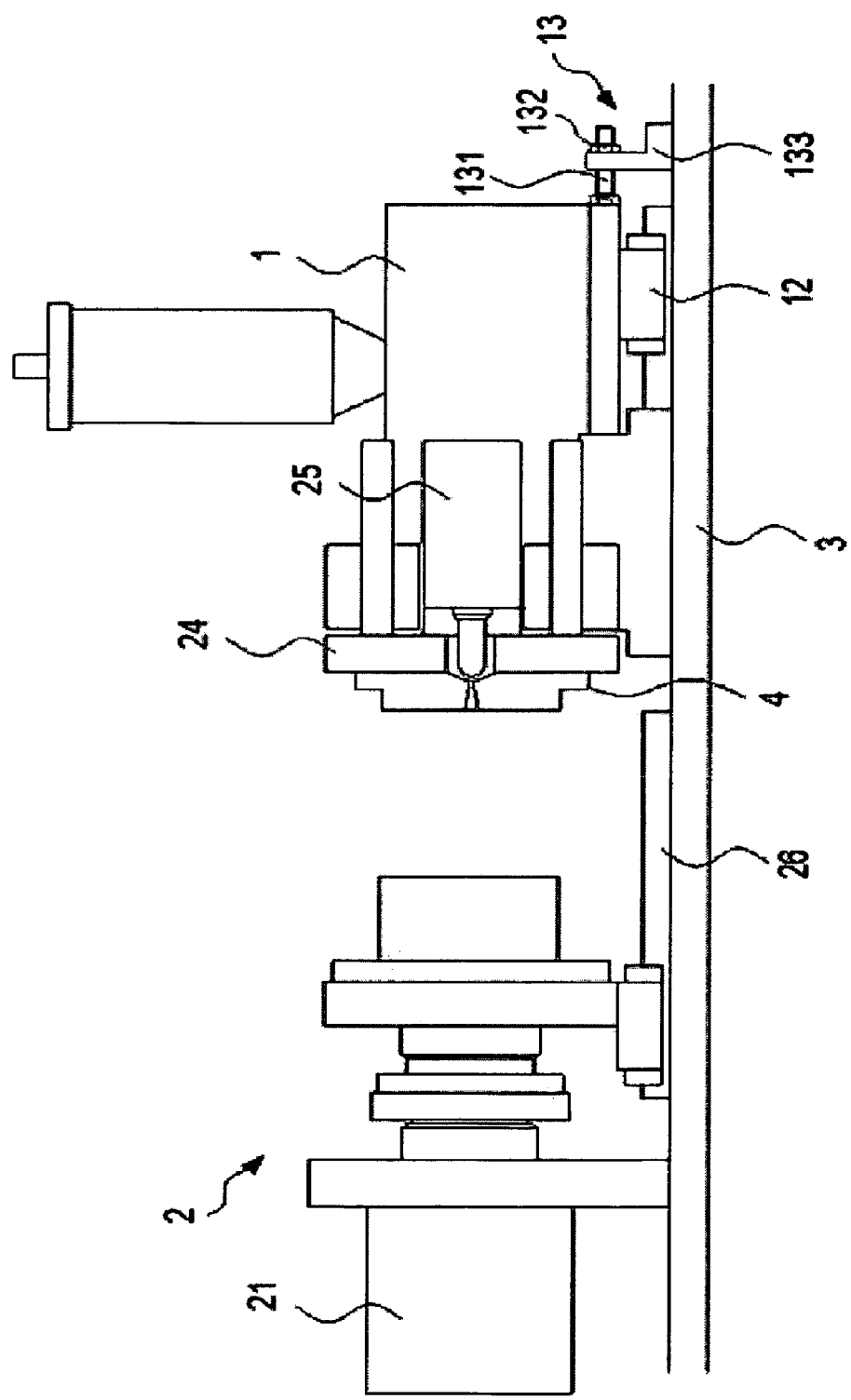
FIG. 4 shows a side view of the nozzle-contacting device of the injection molding machine in another preferred embodiment according to the present invention.
Figure 5:
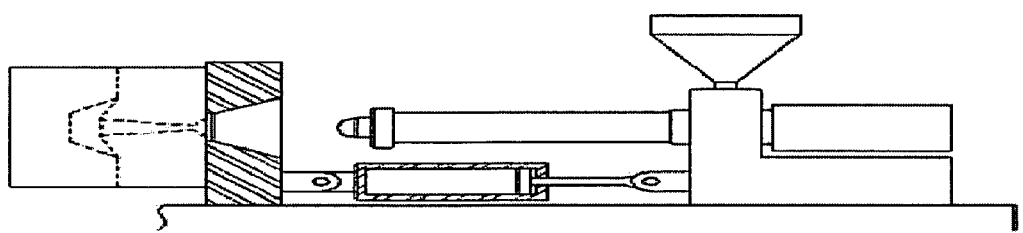
FIG. 5 shows a side view of an injection molding machine in the prior art.
Figure 6:
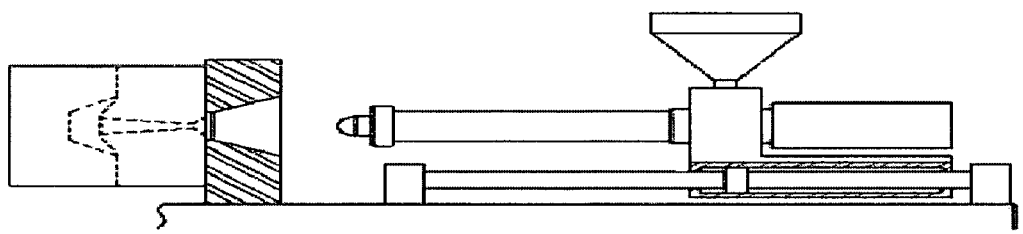
FIG. 6 shows a side view of another injection molding machine in the prior art.
Figure 7:
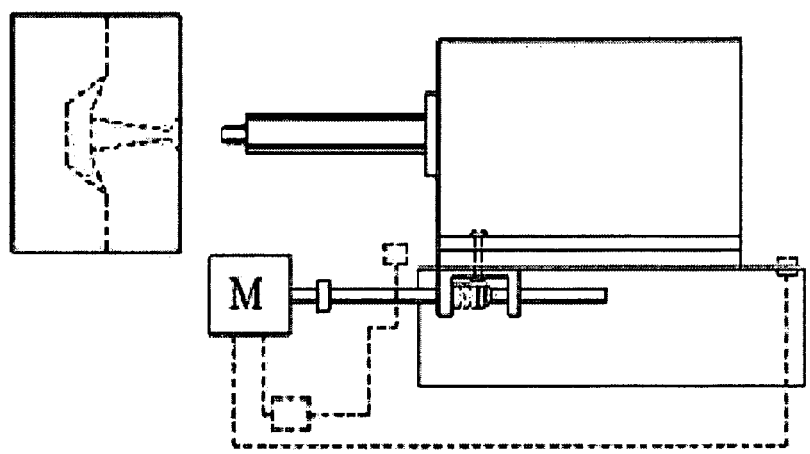
FIG. 7 shows a side view of the injection molding machine in U.S. Pat. No. 4,676,730.

Please refer to FIG. 4. In the nozzle-contacting device of the injection molding machine according to the present invention, the mold-holding device can also lacks plural tie rods 23 but sets the adjusting plate 24 on the front end of the injection module 1 for being guided to move by a guiding rod 26.

The nozzle-contacting device of the injection molding machine according to the present invention, when being compared with the other prior arts, further includes the advantages as follows:

1. The nozzle-contacting device of the injection molding machine according to the present invention utilizes the clamping force produced by the mold-clamping structure to push the injection module and the mold, so that a contacting force will be produced between the nozzle set at the front end of the injection module and the mold. The contacting force produced by this way will be greater than that produced by the prior art, and when an injection pressure or a retaining pressure is getting higher, the clearance will not be produced between the nozzle and the mold and a leak of the plastic will not be happened.

2. In the nozzle-contacting device of the injection molding machine according to the present invention, before injection molding, through the nozzle-adjusting device to pre-leave the compressing clearance between the nozzle-adjusting device and the dead plate, the nozzle will take up the compression amount of the compressing clearance and produce an elastic deformation so as to increase the contacting force between the nozzle and the mold when the nozzle and the mold suffer the compression.

Many changes and modifications in the above described embodiment of the invention can, of course, be carried out without departing from the scope thereof. Accordingly, to promote the progress in science and-the useful arts, the invention is disclosed and is intended to be limited only by the scope of the appended claims.

What is claimed is:

1. A nozzle-contacting device of an injection molding machine, comprising:

an injection module set on a sliding trough and having a nozzle set at a front end thereof;

a nozzle-adjusting device set on a lathe bed for adjusting a compressing clearance; and a mold-holding structure set on said lathe bed and comprising an adjusting plate and a mold-clamping structure, wherein said mold-clamping structure is set on plural tie rods, said mold is fixed on said adjusting plate which is sleeved on said plural tie rods, and one or more drivers which are set on a front end of said mold-clamping structure is penetrating a dead plate of said molding-holding structure for connection to said adjusting plate;

wherein said injection module is set on a front end of said dead plate of said mold-holding structure, said dead plate has a perforation set on a centre thereof corresponding to a position of said nozzle of said injection module, when adjusting said compressing clearance, said nozzle-adjusting device pushes said injection module set on said sliding trough to slide toward said mold-holding structure and against said mold for obtaining said compressing clearance between said adjusting plate and said dead plate, and said mold-clamping structure produces a clamping force for forcing said nozzle against said mold and takes up said compressing clearance for producing a nozzle-contacting force so as to inject a plastic from said injection module into a mold cavity of said mold through said nozzle.

2. A nozzle-contacting device of an injection molding machine, comprising:

an injection module set on a sliding trough and having a nozzle set at a front end thereof;

a nozzle-adjusting device set on a lathe bed for adjusting a compressing clearance; and a mold-holding structure set on said lathe bed and comprising an adjusting plate and a mold-clamping structure, wherein said adjusting plate is set on said front end of said injection module for being guided to move by a guiding rod, said mold is fixed on said adjusting plate and one or more drivers which are set on a front end of said mold-clamping structure is penetrating a dead plate of said molding-holding structure for connection to said adjusting plate;

wherein said injection module is set on a front end of said dead plate of said mold-holding structure, said dead plate has a perforation set on a centre thereof corresponding to a position of said nozzle of said injection module, when adjusting said compressing clearance, said nozzle-adjusting device pushes said injection module set on said sliding trough to slide toward said mold-holding structure and against said mold for obtaining said compressing clearance between said adjusting plate and said dead plate, and said mold-clamping structure produces a clamping force for forcing said nozzle against said mold and takes up said compressing clearance for producing a nozzle-contacting force so as to inject a plastic from said injection module into a mold cavity of said mold through said nozzle.

3. A nozzle-contacting device of an injection molding machine according to claim 1, wherein said nozzle-adjusting device is capable of moving said injection module to sliding on said sliding trough by utilizing a bolt.

4. A nozzle-contacting device of an injection molding machine according to claim 1, wherein said one or more drivers drives said adjusting plate to move on said plural tie rods by utilizing a vapour cylinder.

5. A nozzle-contacting device of an injection molding machine according to claim 1, wherein said sliding trough is locked and fixed on said lathe bed.

6. A nozzle-contacting device of an injection molding machine according to claim 1, wherein said nozzle-adjusting device comprises an adjusting seat, a screw, and a screw nut.

7. A nozzle-contacting device of an injection molding machine according to claim 3, wherein said nozzle-adjusting device is capable of moving said injection module to slide on said sliding trough by utilizing a vapour cylinder, a hydraulic cylinder, or a screw driven by a motor.

8. A nozzle-contacting device of an injection molding machine according to claim 4, wherein said one or more driver is capable of driving said adjusting plate to slide on said plural tie rods or said guiding rod by utilizing a hydraulic cylinder, a servo-motor, a screw, or a bolt.

9. A nozzle-contacting device of an injection molding machine according to claim 6, wherein said screw of said nozzle-adjusting device is capable of being rotated to move forward and backward to against said injection module for adjusting said compressing clearance.

10. A nozzle-contacting device of an injection molding machine according to claim 6, wherein said screw of said nozzle-adjusting device is capable of being rotated forward to against said injection module for moving said nozzle forward to reject against said adjusting plate and increasing said compressing clearance between said adjusting plate and said dead plate.

11. A nozzle-contacting device of an injection molding machine according to claim 6, wherein said screw of said nozzle-adjusting device is capable of being rotated backward for reducing said compressing clearance between said adjusting plate and said dead plate.

* * * * *